United States Patent [19]

Nieglos et al.

[11] Patent Number: 5,311,602
[45] Date of Patent: May 10, 1994

[54] CIRCUIT FOR COMPRESSING DIGITAL IMAGES WHILE RETAINING IMAGE FIDELITY

[75] Inventors: Donald J. Nieglos, Salt Lake City, Utah; Daniel A. Neuss, Madison, Ala.

[73] Assignee: Unisys Corporation, Blue Bell, Pa.

[21] Appl. No.: 840,890

[22] Filed: Feb. 25, 1992

[51] Int. Cl.$^5$ .............................. G06K 9/36
[52] U.S. Cl. ...................... 382/56; 358/426
[58] Field of Search ............. 364/715.02; 395/128; 341/55, 95; 382/56; 358/460, 426, 456, 261.4, 427

[56] References Cited

U.S. PATENT DOCUMENTS

| | | | |
|---|---|---|---|
| 4,245,258 | 1/1981 | Holladay | 382/56 |
| 4,866,533 | 9/1989 | Nagashima | 358/261.4 |
| 5,070,532 | 12/1991 | Faul et al. | 382/56 |
| 5,111,194 | 5/1992 | Oneda | 358/456 |
| 5,175,807 | 12/1992 | Cawley et al. | 395/128 |

Primary Examiner—David K. Moore
Assistant Examiner—D. R. Anderson
Attorney, Agent, or Firm—Charles J. Fassbender; Mark T. Starr

[57] ABSTRACT

An image compressing circuit is comprised of: a number generating circuit which generates a respective number for each X-bit pixel in an input image such that the respective number changes in a cyclic fashion from pixel to pixel across each row of pixels in the input image; and, a translator circuit which performs a translation on each individual X-bit pixel together with its respective number to produce a corresponding Y-bit pixel, where Y is less than X. This translation is one which, when performed sequentially on several consecutive X-bit pixels of a single magnitude and their respective numbers for one cycle of the numbers, produces a series of Y-bit pixels of one or two magnitudes with an average value that increases monotonically as the single magnitude increases. By these Y-bit pixel series, the fidelity of the input image is retained even though Y is less then X.

11 Claims, 4 Drawing Sheets

CIRCUIT FOR COMPRESSING DIGITAL IMAGES WHILE RETAINING IMAGE FIDELITY

BACKGROUND OF THE INVENTION

This invention relates to circuits for compressing a digital image such that the compressed image retains its fidelity.

By a digital image is herein meant an array of pixels which are arranged in rows and columns. Such an array is called a frame; and, it is generated by various video sources like, for example, a digital camera or a digital storage device which stores and regenerates the camera images.

Each pixel consists of a certain number of bits which specify the brightness of the image at the pixel's row-column location in the frame. A pixel having "X" bits will range in magnitude from 0 to $2^x - 1$. A magnitude of 0 corresponds to minimum brightness; a magnitude of $2^x - 1$ corresponds to maximum brightness; and the remaining magnitudes between 0 and $2^x - 1$ correspond to intermediate brightness levels.

Suppose now that a digital image having X bits per pixel is to be displayed on a video display which can accommodate only Y-bits per pixel, where Y is less than X. For example, suppose the video source provides an image with 5-bits per pixel (32 brightness levels), but the video display can only display pixels with 3-bits (8 brightness levels).

In the above case, the 5-bit pixels must somehow be compressed to 3-bit pixels. However, in making that compression it would seem that a loss of fidelity in the displayed image is unavoidable. Such a loss of fidelity will occur if, for example, the 3-bit pixel is obtained by simply stripping off the two least significant bits from the 5-bit pixel.

Accordingly, a primary object of the invention is to provide an image compressing circuit which compresses X-bit pixels to Y-bit pixels, where Y is less than X, while retaining image fidelity.

BRIEF SUMMARY OF THE INVENTION

In accordance with the present invention, an image compressing circuit is comprised of: a) a number generating circuit which generates a respective number for each X-bit pixel in the input image such that the respective number changes in a cyclic fashion from pixel to pixel across each row of the input image; and b) a translator circuit which performs a translation on each individual X-bit pixel together with its respective number to produce a corresponding Y-bit pixel, where Y is less than X. This translation is characterized as one which, when performed sequentially on several consecutive X-bit pixels of a single magnitude and their respective numbers for one cycle of the numbers, produces a series of Y-bit pixels of one or two magnitudes with an average value that increases monotonically as the single magnitude of the X-bit pixels increase.

For example, in one embodiment of the invention, four consecutive 5-bit pixels of magnitude 15 are translated into a 3-bit pixel series of magnitudes 3, 4, 4, 4; four consecutive 5-bit pixels of magnitude 16 are translated into a 3-bit pixel series of magnitude, 4, 4, 4, 4; four consecutive 5-bit pixels of magnitude 17 are translated into a 3-bit pixel series of 4, 5, 4, 4; etc. These translated 3-bit pixel series range from 0, 0, 0, 0 to 7, 7, 7, 7; and each particular translated series has a different average value. When the translated 3-bit pixel series is displayed on a video display, what is "seen" by a viewer is the average value of the pixel series, rather than four separate pixels. Consequently, the image on the video display appears to have many more brightness levels than eight.

BRIEF DESCRIPTION OF THE DRAWINGS

Various embodiments of the present invention, along with their features and advantages, are described in the Detailed Description in conjunction with the accompanying drawings wherein.

DETAILED DESCRIPTION OF THE INVENTION

Figure 1:
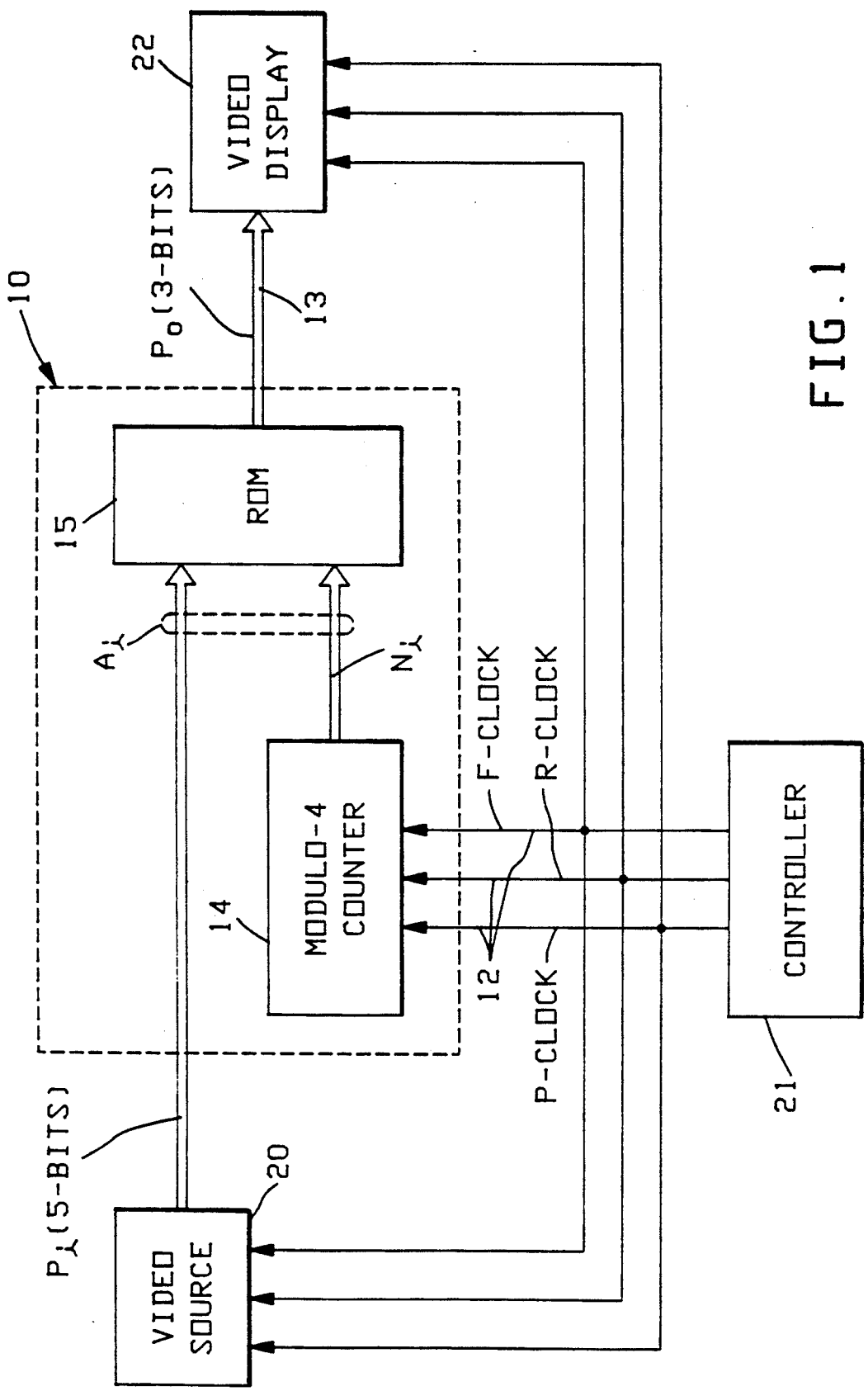
FIG. 1 shows an image compressing circuit which is structured as one particular preferred embodiment of the invention.

Referring now to FIG. 1, the details of one particular preferred embodiment of an image compressing circuit 10 which is structured according to the present invention will be described. This image compressing circuit 10 has a five-bit input bus 11, three control terminals 12, and a three-bit output bus 13.

On the input bus 11, a five-bit input pixel $P_i$ of an input image is presented for compression by a video source 20. On the control terminal 12, three control signals (F-clock, R-clock, and P-clock) are presented by a controller 21. A pulse of the F-clock signal indicates that pixel $P_i$ is the first pixel in the first row of a frame; the first pixel in each succeeding row is indicated by a pulse of the R-clock signal; and succeeding pixels in each row are indicated by a pulse of the P-clock signal.

On the output bus 13, a three-bit output pixel $P_0$ is generated by the image compressing circuit 10 in response to the five-bit input pixel $P_i$ from the video source 20 and the control signals from controller 21. To generate this output pixel $P_0$, the image compressing circuit 10 includes a modulo-four counter 14 and a read-only-memory 15. Counter 14 receives the F-clock, R-clock, and P-clock signals; and in response it generates a respective two-bit modulo-four number $N_i$ for each of the input pixels $P_i$. That is, the number $N_i$ is respectively generated as 0, 1, 2, 3, 0, 1, 2, 3, etc. for the first, second, third, fourth, fifth, sixth, seventh, eighth, etc. input pixels of a row.

Each five-bit input pixel $P_i$ is then concatenated with its respective number $N_i$ to form a 7-bit address $A_i$. That address $A_i$ is received by the read-only-memory 15; and in response, a three-bit output pixel $P_0$ is read from the memory onto the output bus 13. In other words, the memory 15 stores one-hundred-twenty-eight three-bit output pixels $P_0$. Each output pixel $P_0$ on bus 13 is then sent to a visual display 22 to there form an output image.

Figure 2:
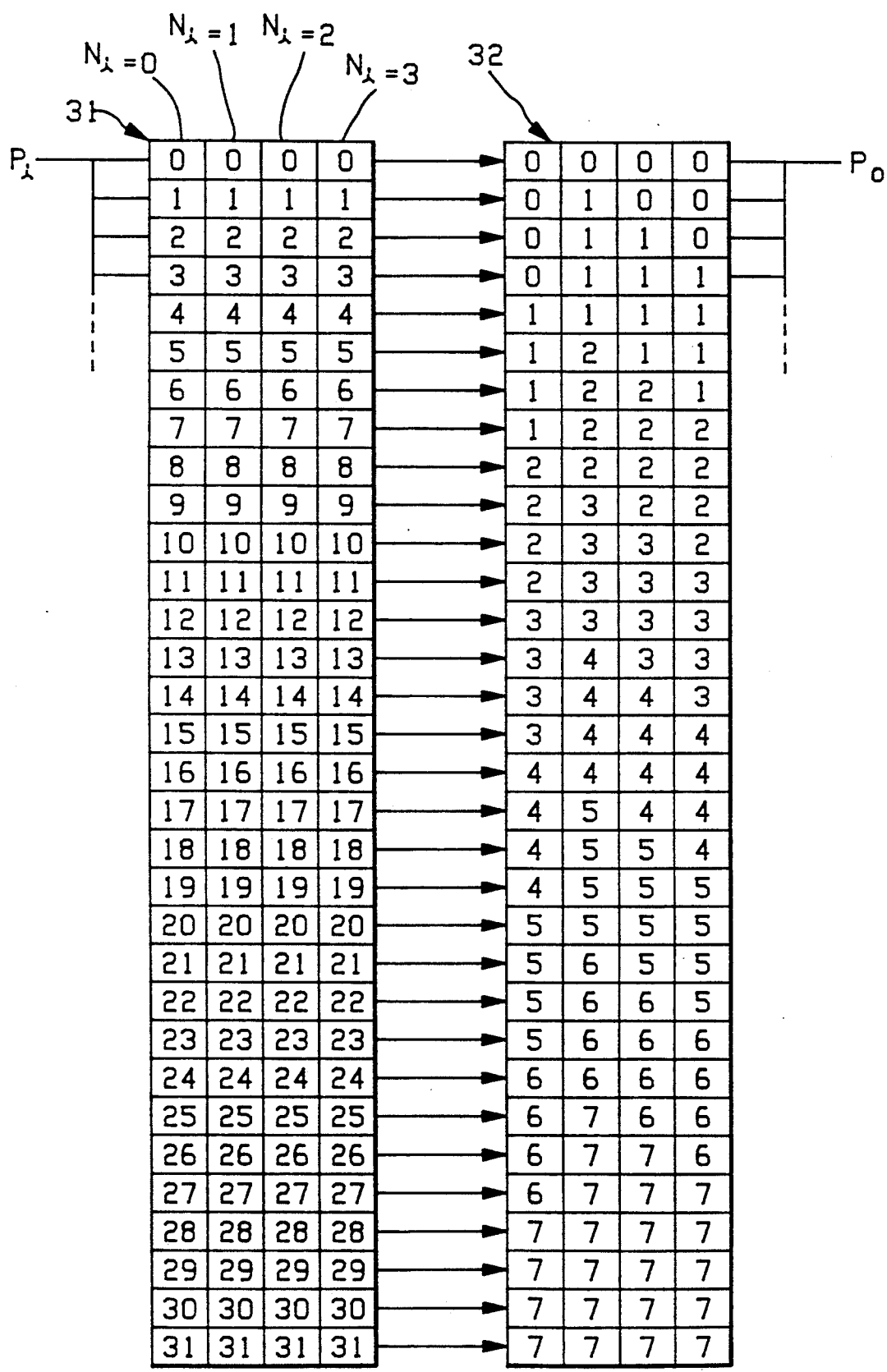
FIG. 2 shows the details of an X-bit to Y-bit pixel translation that is performed by the image compressing circuit of FIG. 1.

Additional details on how the read-only-memory 15 translates each address $A_1$ to a particular output pixel $P_0$ are shown in FIG. 2. There, all possible combinations of the input pixels $P_i$ and their respective numbers $N_i$ are tabulated in a matrix 31. Corresponding output pixels $P_0$ for each input pixel and its respective number are tabulated in another matrix 32. For example, an input pixel of magnitude fifteen having a respective number $N_i$ of zero is translated to an output pixel of magnitude three; whereas an input pixel of magnitude fifteen having a respective number of one is translated to an output pixel of magnitude four.

One important point about the translation of FIG. 2 is that each series of four consecutive input pixels $P_i$ of a single magnitude is translated into a series of four consecutive output pixels $P_0$ of one or two magnitudes; and, the average value of the four output pixels increases, in a monotonic fashion, as the single magnitude of the four input pixels increase. For example, four consecutive input pixels having magnitudes 9, 9, 9, 9, are translated to four consecutive output pixels having magnitudes 2, 3, 2, 2,; and four consecutive input pixels having magnitudes 10, 10, 10, 10 are translated to four consecutive output pixels having magnitudes 2, 3, 3, 2. The output pixels 2, 3, 2, 2 have an average value of $2\frac{1}{4}$, and the output pixels 2, 3, 3, 2 have an average value of $2\frac{1}{2}$.

The above point is important because when a digital image is viewed on a display by a human being, the eye and brain "see" the average of several adjacent pixels, rather than see each pixel individually. In the matrix 32, the rows contain a total of twenty-nine different output pixel series, each of which has a different average value. This means that when the pixel rows of matrix 32 are viewed on the video display 22, twenty-nine different shades will be perceived. By comparison, the individual output pixels $P_0$ in the matrix 32 have only eight different values. Consequently, with the present invention, the total number of apparent shades in the image that is perceived on the video display 22 is greatly increased.

From the above description of FIG. 1 and FIG. 2, it would seem that in order for the image compression circuit 10 to operate properly, the magnitude of the input pixels $P_i$ from the video source 20 must somehow be made constant in groups of four. That, however, is not the case; and in fact, the magnitude of the input pixels $P_i$ can change from any one pixel to the next.

Suppose, for example, that the magnitude of the input pixels $P_i$ changes slowly across a row of a frame. In that case, some groups of four input pixels will have pixels of two consecutive magnitudes, M and M+1. However, inspection of FIG. 2 shows that when the input pixel $P_i$ changes in magnitude by one, the corresponding output pixel $P_0$ either stays unchanged or changes in magnitude by one. Consequently, input pixel groups that have pixels of magnitude M and M+1 will be translated into an output pixel group having an average value that is either correct or only slightly in error. And, as a practical matter, such a discrepancy will not be perceptible when the output image is viewed on the video display 22.

On the other hand, suppose that the magnitude of the input pixels makes an abrupt change at some point across a row of a frame. In that case, when the abrupt change occurs, the translation of FIG. 2 generates an output pixel $P_0$ with a magnitude that also changes abruptly with the input pixel. For example, if the input pixel $P_i$ changes in magnitude from zero to twenty-two, the output pixel $P_0$ changes in magnitude from zero to either five or six, depending on the counter number $N_i$. Here again, the difference between the two possible output pixels in a single group of four pixels is too small to be perceptible when viewed on the video display 22.

One preferred embodiment of the invention has now been described in detail. In addition, however, certain changes and modifications can also be made to those details to thereby obtain alternative embodiments.

As one such modification, the output pixels $P_0$ in each row of the matrix 32 can be rearranged in any order. For example, the row of output pixels having magnitudes 0, 1, 0, 0 can be arranged to 1, 0, 0, 0 or 0, 0, 1, 0 or 0, 0, 0, 1. In each such row, the average value of the pixels remains the same; so consequently the total number of apparent shades remains unchanged.

As another modification, the matrix 32 of FIG. 2 can be changed such that the rows of 0, 0, 0, 0 and 4, 4, 4, 4 and 7, 7, 7, 7 are each duplicated one time, rather than having the row of 7, 7, 7, 7 be repeated four times. This modification more evenly distributes the repeated rows within the matrix. To make this modification, the top two rows of matrix 32 are set to 0, 0, 0, 0; all of the matrix 32 rows from 0, 1, 0, 0 to 3, 4, 4, 4 shifted down by one row; two rows of 4, 4, 4, 4 then follow; and all of the matrix 32 rows from 4, 5, 4, 4 to 6, 7, 7, 7 are then shifted down two rows.

As still another modification, the matrix 32 of FIG. 2 can be changed such that all of the twenty-nine different pixel series are not used. For example, the output pixel series of 0, 0, 0, 0 can be duplicated on the first two rows; the output pixel series of 0, 1, 0, 0 can be duplicated on the next two rows; the output pixel series of 0, 1, 1, 0 can be duplicated on the next two rows; etc. With this modification, the total number of different output pixel series would still be more than eight, and thus the number of apparent shades in the output image would likewise be more than eight.

As an additional modification, the counter 14 of the FIG. 1 image compressing circuit 10 can be changed to generate either more than four or less than four numbers per cycle. Preferably, the cycle is limited to from two to eight numbers. If there are five numbers per cycle, then the matrixes 31 and 32 must be modified to have five columns; if there are six numbers per cycle, then the matrixes 31 and 32 must be modified to have six columns; etc.

By increasing the number of columns in matrix 32, the total number of output pixel series, which have different average values, is increased. Thus, more rows (which each have a different average value) can be added to the matrix. For example, if the matrix 32 is modified to have five columns, then the rows can have output pixel series of 0, 0, 0, 0, 1 and 0, 0, 0, 1, 1 and 0, 0, 1, 1, 1 and 0, 1, 1, 1, 1 and 1, 1, 1, 1, 1. In general, the total number of output pixel series that can be generated with different average values is $(2^Y)(N)-(N-1)$ where N is the total number of respective numbers per cycle.

As the total number of output pixel series having different average values is increased, the number of bits per input pixel can be increased to more than five bits. However, the number N is preferably limited to a maximum of eight so that all of the output pixels in one cycle will remain small enough to be averaged by the eye-brain when viewed on the visual display 22.

As one further modification, the counter 14 of the FIG. 1 image compressing circuit 10 can be adopted to start its cycle with a different number on adjacent rows of a frame. For example, the counter 14 can start at number 0 in response to the R-clock pulse for even numbered rows, and start at number 2 in response to the R-clock pulses for odd numbered rows. By this means, any area of the input image which is made of input pixels having a single magnitude will be translated into a corresponding area of the output image in which identical rows of output pixels from matrix 32 are not lined-up in vertical lines. This, in turn, eliminates the perception of vertical streaks in the output image.

Figure 3:
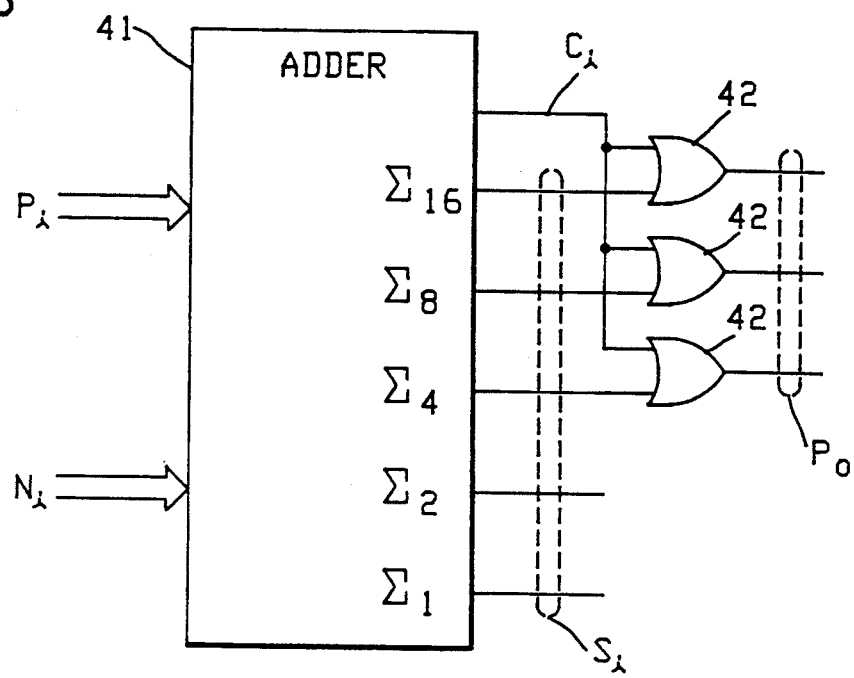
FIG. 3 shows a second embodiment of an image compressing circuit that is structured according to the invention.

Still another modification which can be made to the FIG. 1 image compressing circuit 10 is that the read-only-memory 15 can be replaced with a digital logic circuit which performs any of the translations that were described above. One such logic circuit is shown in FIG. 3; and, it consists of an adder circuit 41 and three OR-gates 42. In operation, the adder 41 adds the number $N_i$ from the counter 14 to the input pixel $P_i$; and, this produces a five-bit sum $S_i$ plus a carry $C_i$. Then, the three high-order bits of the sum $S_i$ are logically OR-ed with the carry $C_i$, and that produces the three bit output pixel $P_O$ at the output of the OR-gates 42.

Figure 4:
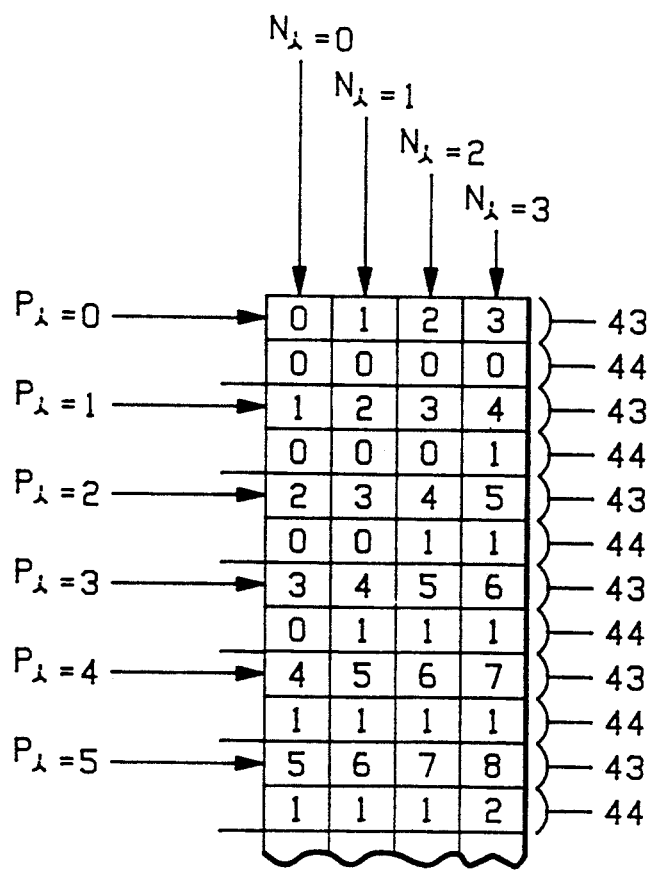
FIG. 4 shows a diagram which explains the operation of the FIG. 3 embodiment; and, FIG. 5 shows a third embodiment of an image compressing circuit that is structured according to the invention.

FIG. 4 is a matrix which further shows that the adder 41 and OR-gates 42 do, in fact, generate the output pixels $P_O$ correctly. In FIG. 4, there are two rows, 43 and 44, for each input pixel $P_i$. Row 43 contains the sum $S_i$ that is produced by the adder 41, and row 44 contains the output pixel $P_O$ that is generated from the sum $S_i$ by the OR-gates 42.

Figure 5:
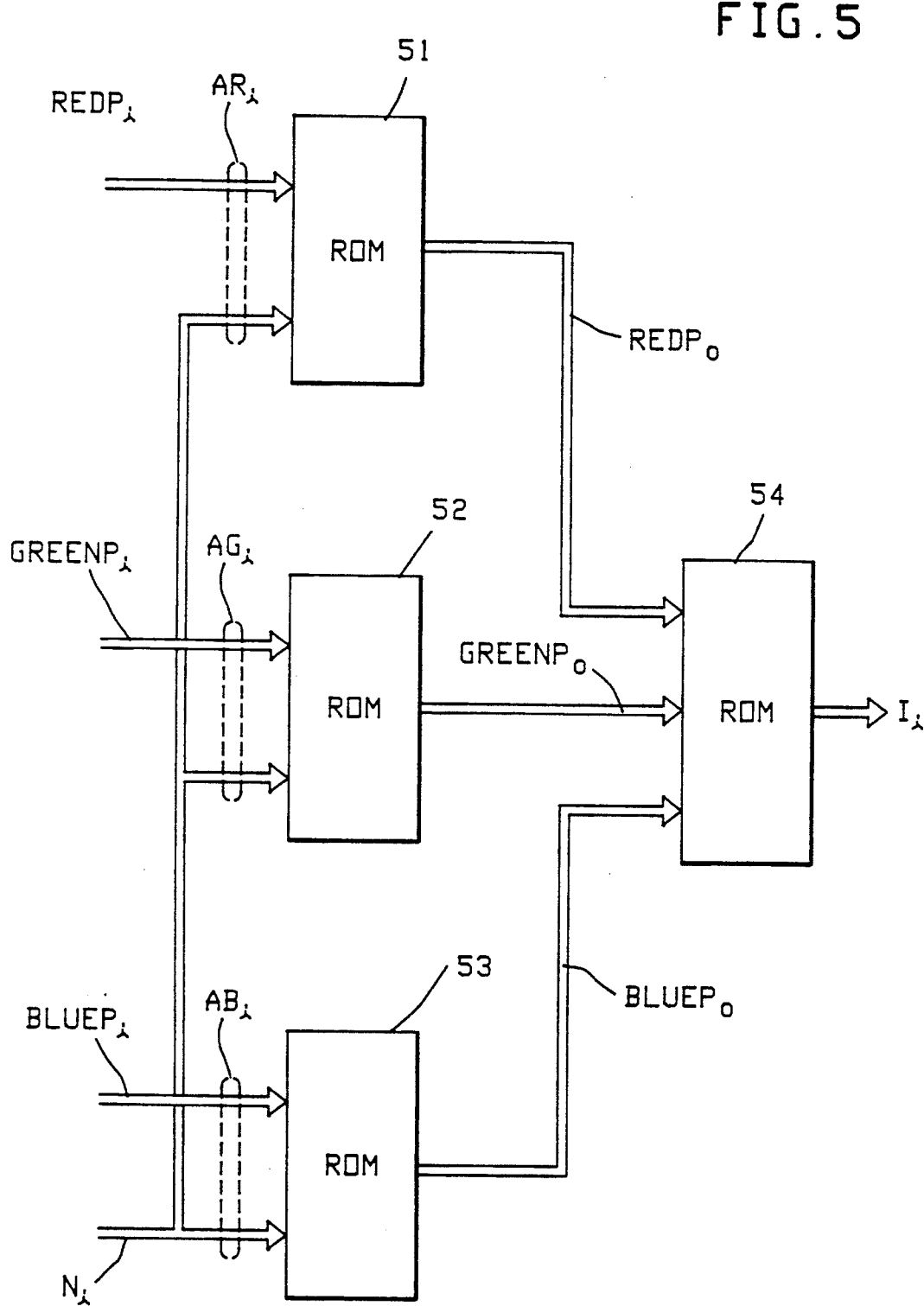

Turning now to FIG. 5, it shows yet another embodiment of the present invention which compresses pixels of an input image that is in color. In a colored input image each pixel location has a red pixel and a green pixel and a blue pixel; and in FIG. 5, these pixels are respectively labeled $REDP_i$, $GREENP_i$, and $BLUEP_i$. Each of the above pixels is five-bits; and, they are respectively sent to three read-only-memories 51, 52, and 53.

In parallel with the pixels, the number $N_i$ from the module-four counter 14 is sent to all three of the read-only-memories 51, 52, and 53. Memory 51 concatenates the pixel $REDP_i$ with the number $N_i$ to form an address $AR_i$; memory 52 concatenates the pixel $GREENP_i$ with the number $N_i$ to form an address $AG_i$; and memory 53 concatenates the pixel $BLUEP_i$ with the number $N_i$ to form an address $AB_i$.

Each of the addresses $AR_i$, $AG_i$, and $AB_i$ is then respectively translated by the read-only-memories 51, 52, and 53 to generate three compressed output pixels, $REDP_O$, $GREENP_O$, and $BLUEP_O$. Each output pixel contains three-bits; and each output pixel is formed by the translation of FIG. 2, or by any one of the FIG. 2 modifications that were previously described.

One modified translation which works particularly well with the FIG. 5 embodiment, is to limit the magnitudes of the output pixels in matrix 32 to 0, 1, 2, 3, 4, and 5. With this modified translation, the pixel series in the rows of the modified matrix 32 monotonically increase from 0, 0, 0, 0 to 5, 5, 5, 5; and, several rows are duplicated at evenly spaced intervals in order to fill up the matrix. One particular way in which this can be achieved is to generate the output pixels $P_O$ in matrix 32 according to the translation $P_O$=integer part of $(F_1 P_i + F_2 N_i)$ where $F_1$ and $F_2$ respectively are the fractions of 6/32 and $\frac{1}{4}$.

Since each output pixel by the above translation is limited to one of six magnitudes, it follows that the total number of pixel magnitude combination from all three memories is $6 \times 6 \times 6$, or two-hundred-sixteen. Thus, each combination of the pixel magnitudes from all three memories can be encoded by another memory 54 into a single eight-bit index $I_i$. This is because with eight bits, more than two-hundred-sixteen permutations can be generated. These eight-bit indices $I_i$ are suitable for storage in any conventional byte oriented (eight bit oriented) read-write memory.

Based on the above Detailed Description, the present invention is claimed as follows.

What is claimed is:

1. An image compressing circuit which is comprised of:
   a video input circuit for producing first electrical input signals which represent a digital input image that is made of multiple rows of X-bit pixels;
   a number generating circuit, coupled to said video input circuit, which generates second electrical input signals that identify a respective number for each X-bit pixel in said input image such that across each row the numbers occur as a particular number series which cyclically repeats;
   a translator circuit, coupled to said video input circuit and number generating circuit, which performs a translation on each individual X-bit pixel together with its respective number to produce an electrical output signal that represents a corresponding Y-bit pixel, where Y is less than X and more than one; and,
   said translation, when performed sequentially on consecutive X-bit pixels of a single magnitude in a row for two cycles of said numbers, producing two identical series of said Y-bit pixels with a) all of said Y-bit pixels within a series having only one or two magnitudes and b) said Y-bit pixel series having an average value that increases monotonically as said single magnitude increases.

2. An image compressing circuit according to claim 1 wherein said translator circuit includes a memory which has said Y-bit pixels stored therein and which is addressed by said individual X-bit pixel together with its respective number to perform said translation.

3. An image compressing circuit according to claim 1 wherein said translator circuit includes a logic circuit which logically combines each X-bit pixel and its respective number to perform said translation.

4. An image compressing circuit according to claim 1 wherein said translator circuit generates said Y-bit pixel as the integer part of $F_1 P_i + F_2 N_i$ where $P_i$ is said X-bit pixel, $N_i$ is said respective number, and $F_1$ is 6/32 and $F_2$ is $\frac{1}{4}$.

5. An image compressing circuit according to claim 1 wherein said translator circuit produces a total of $(2^Y)(N) - (N-1)$ different Y-bit pixel series, where N is the total number of respective numbers per cycle.

6. An image compressing circuit according to claim 1 wherein one complete cycle of respective numbers from said number generating circuit is less than nine numbers.

7. An image compressing circuit according to claim 1 wherein said number generator generates said respective number in one particular cyclic sequence for alternate rows of said X-bit pixels, and generates said respective number in a different cyclic sequence for all remaining rows of said X-bit pixels.

8. An image compressing circuit according to claim 1 wherein said number generating circuit is a cyclic digital counter.

9. An image compressing circuit according to claim 1 wherein associated with each of said X-bit pixels in said digital input image are two other X-bit pixels, and wherein said translator circuit translates all three associated X-bit pixels using the same number for each of the three translations.

10. An image compressing circuit according to claim 6 wherein said translator circuit includes a memory which has said Y-bit pixels stored therein and which is addressed by said individual X-bit pixel together with its respective number to perform said translation.

11. An image compressing circuit according to claim 7 wherein said translator circuit includes a memory which has said Y-bit pixels stored therein and which is addressed by said individual X-bit pixel together with its respective number to perform said translation.

* * * * *